United States Patent [19]
Borsuk et al.

[11] 3,819,859
[45] June 25, 1974

[54] HORIZONTAL SYNC DETECTOR AND VIDEO CLAMP CIRCUIT

[75] Inventors: Michael Horward Borsuk, Red Bank; Paul Nolan Browne, Shrewsbury; Arden Bernard Wright, Ocean Township, Monmouth County, all of N.J.

[73] Assignee: Bell Telephone Laboratories, Incorporated, Murray Hill, N.J.

[22] Filed: Dec. 26, 1972

[21] Appl. No.: 318,118

[52] U.S. Cl. 178/69.5 TV, 178/7.3 S, 178/DIG. 12, 179/2 TV
[51] Int. Cl. .......... H04n 5/04
[58] Field of Search ........ 178/7.3 S, 7.5 S, DIG. 12, 178/7.3 R, 7.5 R, 7.5 DC, 7.3 DC, 69.5 TV, DIG. 26; 179/2 TV

[56] References Cited

UNITED STATES PATENTS

| | | | |
|---|---|---|---|
| 2,564,017 | 8/1951 | Maggio | 178/7.3 DC |
| 2,824,224 | 2/1958 | Fulmer | 178/DIG. 12 |
| 3,699,256 | 10/1972 | Roth | 178/69.5 TV |

*Primary Examiner*—Robert L. Richardson
*Assistant Examiner*—Mitchell Saffian
*Attorney, Agent, or Firm*—Daniel D. Dubosky

[57] ABSTRACT

A composite video signal is coupled by way of a first path through a gated clamp circuit to one input of a gating circuit. The composite video signal is also coupled to a low-pass filter which removes high frequency energy in the composite video signal. Amplitude peaks in the video signal at the output of the low-pass filter cause an amplitude detector to develop voltage pulses during each one of the horizontal sync pulse intervals. In response to these voltage pulses, a strobe generator causes the gated clamp to operate and clamp the composite video signal to a reference voltage during the sync interval. In addition, the voltage pulse also causes a monostable multivibrator to generate a window pulse at a second input of the gating circuit, the window pulse having an interval sufficiently long to always encompass the trailing edge of the horizontal sync pulse. As a result, the gating circuit passes the trailing edge of the horizontal sync pulse in the composite video signal and blocks the voltage spikes present during the active region of the video signal.

4 Claims, 2 Drawing Figures

HORIZONTAL SYNC DETECTOR AND VIDEO CLAMP CIRCUIT

BACKGROUND OF THE INVENTION

This invention relates to video signal processing circuits and, more particularly, to circuits which extract synchronizing information from a composite video signal.

Video signals generated in connection with visual telephone service are pre-emphasized during the active region of the video signal in the transmitting portion of the visual telephone station set. This pre-emphasis consists of providing higher than normal signal amplitudes for the high frequency components of the video signal in order to insure that the high frequency components will not be degraded by the noise and interference encountered in transmission over the visual telephone network. The horizontal sync pulses present in this video signal are not pre-emphasized. Accordingly, many of the voltage spikes created by the pre-emphasis in the active region of the video signal are larger in magnitude than the voltage pulse present to indicate the horizontal sync interval. As a result, the composite video signal cannot simply be coupled through an amplitude clipping detector in order to extract the synchronizing information for to do so would create voltage pulses from the high frequency information at intervals other than during the horizontal sync intervals. In a present model visual telephone station set, the pre-emphasized composite video signal is first de-emphasized in a low-pass filter before the sync information is extracted in an amplitude clipping-type detector. This results in a degree of imprecision in the horizontal timing information but this imprecision is completely unnoticed in the black and white video of this present model station set. Recent attempts to apply this technique to a video-telephone set in which color information has to be transmitted have indicated that a greater degree of precision in the detection of horizontal timing information is necessary.

The voltage spikes in a pre-emphasized video signal in some ways resemble noise spikes that may be introduced into a video signal that is transmitted over a noisy transmission system. One horizontal sync detector shown in the prior art is said to be able to extract the synchronizing information from a noisy video signal. This sync detector is disclosed in U.S. Pat. No. 3,553,365 of Jan. 5, 1971 to E. Jauernik et al. In the Jauernik et al. patent, the composite video signal is first differentiated and the negative spike produced by differentiation of the leading edge of the sync pulse is caused to excite a tank circuit. The tank circuit is designed to ring at a frequency related to the horizontal sync pulse interval such that a positive pulse of voltage will occur during the instant when the trailing edge of the horizontal sync pulse should occur. This ringing pulse is coupled to one input of a gating circuit. The positive spikes produced by the differentiation are coupled to a second input of the gating circuit. Hence, if a positive spike occurs during the interval when the ringing pulse is present, this pulse is coupled through to the output of the gating circuit thereby indicating that a horizontal sync pulse is present in the video signal. As long as the voltage spikes present in the video signal are not separated by an interval equal to the horizontal sync pulse, the Jauernik et al. circuit should be capable of distinguishing the sync pulses from noise spikes present in the video signal. In the case of a pre-emphasized video signal, however, high contrast edges present in the picture at a separation equivalent to the horizontal sync pulse interval will cause the Jauernik et al. circuit to produce false indications of synchronizing information at its output.

SUMMARY OF THE INVENTION

A primary object of the present invention is to separate synchronizing information from a composite video signal which has voltage spikes during the active (video) region of the type that may be produced by a pre-emphasis of the video signal.

This and other objects are achieved in accordance with the present invention wherein the composite video signal is coupled by way of a first path to one input of a gating circuit. The composite video signal is also coupled by way of a second path to a low-pass filter. The largest voltage peaks present at the output of the low-pass filter are due only to the sync pulses and cause an amplitude clamp detector to produce a voltage pulse during the horizontal sync pulse interval. This voltage pulse is then utilized to trigger a monostable multivibrator which in turn produces a window pulse at a second input of the gating circuit. This window pulse is caused to be sufficiently long in duration such that it always encompasses the trailing edge of the horizontal sync pulse in the composite video signal.

A feature of the present invention is the fact that a gated clamp may be connected to the first-mentioned input of the gating circuit. This clamp is operated in response to the voltage pulse generated by a strobe generator which in turn is triggered from the output of the above-mentioned amplitude clamp detector. The pulse from the strobe generator is much shorter than the window pulse and is caused to be present only during the flat-topped portion of the horizontal sync pulse. As a result, the composite video signal at the input of the gating circuit is clamped to a reference potential, and a clamped video signal is thereby available as an additional feature of the present invention.

BRIEF DESCRIPTION OF THE DRAWINGS

The invention will be more readily understood after reading the following detailed description in conjunction with the drawings wherein.

DETAILED DESCRIPTION

Figure 1:
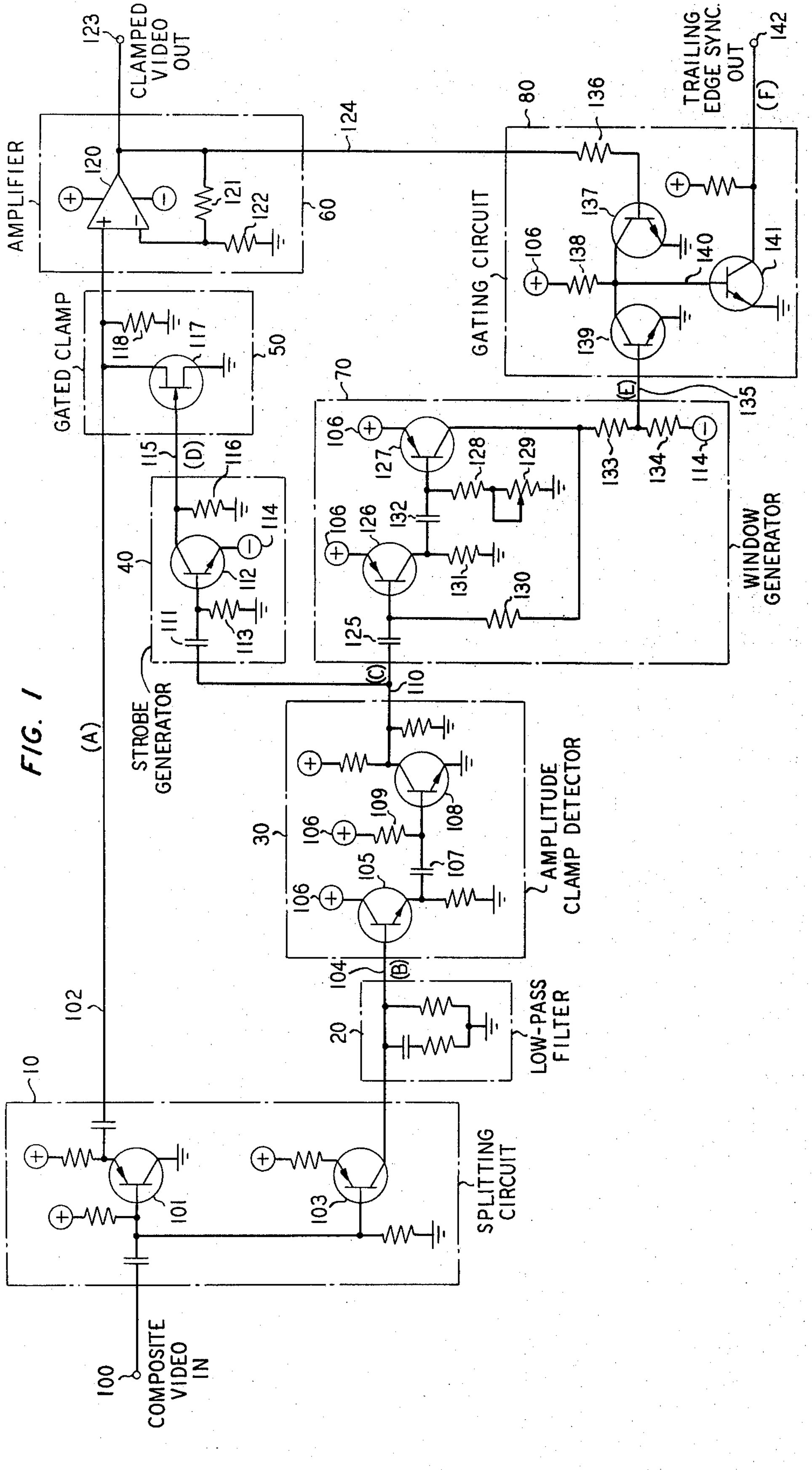
FIG. 1 is a schematic diagram of a horizontal sync detector and a video clamp circuit constructed in accordance with the present invention.
Figure 2:
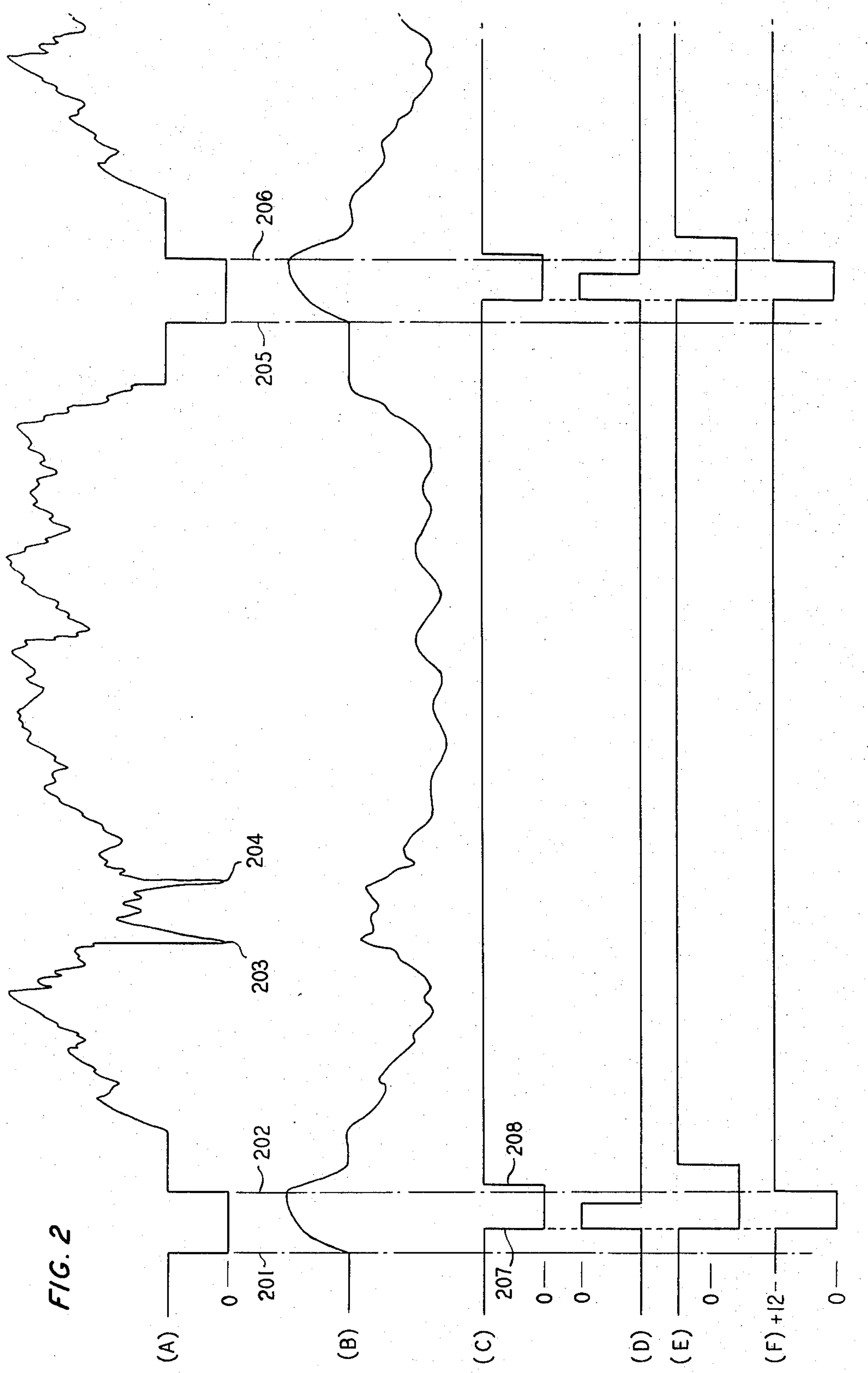
FIG. 2 contains waveforms of voltages versus time useful in describing the operation of the circuit shown in FIG. 1.

In FIG. 1, a composite video signal present at input terminal 100 is coupled to two paths by splitting circuit 10. In one path of splitting circuit 10, the composite video signal is coupled by way of an emitter-follower including transistor 101 onto a line 102. The composite video signal present on line 102 is shown as waveform A of FIG. 2. All waveforms in FIG. 2 are waveforms of voltage versus time. As indicated in waveform A, the signal present on line 102 has positive-going video signals with the horizontal sync pulses being among the most negative parts of the video signal. One horizontal sync pulse in waveform A is present between the instants designated as 201 and 202 in FIG. 2. Also present in waveform A are two negative-going voltage spikes designated as 203 and 204. These voltage spikes are of the type which are produced as a result of pre-emphasizing high contrast edges in the video signal.

The composite video signal from input terminal 100 is also coupled in splitting circuit 10 by way of a common-emitter amplifier including transistor 103 to the input of a low-pass filter 20. The high frequency energy in the composite video signal is removed by low-pass filter 20 and the resulting voltage waveform present at the output of low-pass filter 20 on line 104 is shown as waveform B in FIG. 2. As indicated in waveform B, the voltage spikes present in waveform A have been substantially reduced in magnitude by low-pass filter 20 to the point where they are no longer as large in voltage magnitude as the voltage pulse present during the horizontal sync pulse interval between the times 201 and 202. As is also indicated in waveform B, the horizontal sync pulse now produces the most positive-going voltage in the de-emphasized video signal, a polarity inversion being provided in the common-emitter amplifier circuit including transistor 103.

The video signal on line 104 with the high frequency energy removed is coupled to the input of an amplitude clamp detector 30. In amplitude clamp detector 30, the de-emphasized video signal from line 104 is coupled to the base of a transistor 105, which transistor is connected in an emitter-follower configuration. The signal at the emitter electrode of transistor 105 is coupled through a capacitor 107 to the base electrode of a transistor 108. The base electrode of transistor 108 is also connected through a resistor 109 to positive potential source 106. When the positive peak of voltage occurs in waveform B of FIG. 2 during the horizontal sync pulse interval, transistor 108 is driven into conduction. Transistor 108 remains in conduction until the negative-going voltage present in waveform B after the instant 202 stops the conduction of transistor 108. Transistor 108 remains nonconducting during the entire active region of the video signal until a succeeding horizontal sync pulse is developed in the video waveform between the times designated as 205 and 206. The time constant of capacitor 107 and resistor 109 is caused to be sufficiently large such that transistor 108 will not be driven back into conduction during any portion of the active region of the video signal. On the other hand, discharge of capacitor 107 through resistor 109 is large enough to insure that each sync pulse will penetrate a potential level equal to the forward-bias potential of the base-emitter junction of transistor 108.

When transistor 108 is driven into conduction, its collector electrode is rapidly clamped to ground potential, thereby causing a voltage pulse of the type shown in waveform C in FIG. 2 to be developed on line 110 at the output of amplitude clamp detector 30. As indicated in waveform C, transistor 108 is not driven into conduction during the instant 201 but rather is driven into conduction at a later time, designated as 207 in FIG. 2. At this time 207, the sync pulse in waveform B is much closer to its final amplitude peak. As is also indicated in waveform C of FIG. 2, transistor 108 is not taken out of conduction at an instant which is identical to the trailing edge of the horizontal sync pulse. Due to the rounded edges of the sync pulse in waveform B and the threshold nature of detector 30, the trailing edge of the pulse developed on line 110 is present at an instant 208 which is somewhat later than the trailing edge of the horizontal sync pulse. Consequently, the pulse developed on line 110 in no way provides a precise indication as to the beginning or termination of the horizontal sync pulse. Its presence is simply an indication that a horizontal sync pulse has occurred some time during the interval of the pulse which is present on line 110. The leading edge of the pulse on line 110 is certain to have occurred some time after the leading edge but before the trailing edge of the horizontal sync pulse.

The voltage pulse on line 110 from detector 30 is coupled both to the input of a strobe generator 40 and to the input of a window generator 70. In strobe generator 40, the pulse present on line 110 is coupled through a capacitor 111 to the base electrode of a transistor 112. The base electrode of transistor 112 is also coupled through a resistor 113 to ground potential. During the active region of the video signal when there are no pulses present on line 110, transistor 112 is held in conduction by a negative potential source 114 which s connected to the emitter electrode of transistor 112. During conduction, the collector electrode of transistor 112 provides a negative potential substantially equal to negative potential source 114 on line 115 at the output of strobe generator 40. As shown in FIG. 1, the collector electrode of transistor 112 is also coupled through a resistor 116 to ground potential. When the leading edge of the pulse developed on line 110 is coupled through capacitor 111 to the base electrode, this negative-going pulse back biases the base-emitter junction of transistor 112, and transistor 112 is thereby taken out of conduction. As a result, the potential on line 115 at the output of strobe generator 40 rapidly rises to ground potential as indicated in waveform D of FIG. 2. After this back-bias potential is established on the base electrode of transistor 112, it immediately begins to discharge toward ground potential through resistor 113. When the potential on the base electrode of transistor 112 reaches a potential which is slightly more positive than negative potential source 114, transistor 112 is again driven into conduction, thereby causing the potential on line 115 to return to a negative potential. The values of capacitor 111 and resistor 113 are chosen such that transistor 112 is driven into conduction at a time prior to the termination of the horizontal sync pulse, as indicated in waveform D of FIG. 2. Hence, the positive-going voltage pulse developed on line 115 is present only during the flat-topped portion of the horizontal sync pulse in the composite video signal of waveform A.

The positive-going pulse on line 115 is coupled to the gate electrode of a junction type field-effect transistor 117 in a gated clamp circuit 50. During the active region of the video signal, when a high negative potential is present on line 115, field-effect transistor 117 presents a substantially infinite impedance between its source and drain electrodes. The drain electrode of transistor 117 is connected to line 102 and the source electrode of transistor 117 is connected to ground potential. During the interval when the pulse of waveform D is present on line 115, field-effect transistor 117 presents a very low impedance between its source and drain electrodes, thereby causing line 102 to be clamped to ground potential. As indicated hereinabove, this pulse on line 115 occurs during the horizontal sync pulse interval. Consequently, the composite video signal on line 102 is clamped during the horizontal sync pulse interval to ground potential. A resistor 118 in gated clamp circuit 50 is present simply to provide a bias current to amplifier 120.

The composite video signal on line 102 is connected to the input of an amplifier circuit 60. In amplifier 60, the video signal on line 102 is connected to the noninverting input of an operational amplifier 120. The inverting input of operational amplifier 120 is connected in a negative feedback arrangement by way of resistors 121 and 122. This feedback arrangement simply limits the gain of operational amplifier 120 to a value which will provide the desired peak-to-peak amplitude video signal at an output terminal 123. Operational amplifier 120 is a dc-coupled amplifier and, therefore, the flat-topped portion of the sync pulse in the composite signal on line 102 will appear on line 124 at the output of amplifier 60 at a zero voltage level. The remainder of the composite video signal will be at voltage levels greater than zero.

The voltage pulse developed by amplitude clamp detector 30 on line 110 is also coupled to the input of a window generator 70. In window generator 70, the voltage pulse on line 110 shown in waveform C of FIG. 2 is coupled by way of a capacitor 125 to the base electrode of a transistor 126. A second transistor 127 in window generator 70 is connected with its emitter electrode to positive potential source 106 and its base electrode through a resistor 128 and a variable resistor 129 to ground potential. During the active region of the video interval when no pulse is present on line 110, transistor 127 is forward-biased into conduction by the current which flows from potential source 106 through the base-emitter junction of transistor 127 through resistors 128 and 129 to ground. Hence, the collector electrode of transistor 127 is at a potential substantially equal to the potential of positive potential source 106. The base of the first-mentioned transistor is connected by way of a resistor 130 to the collector electrode of transistor 127. Although the emitter of transistor 126 is also connected to positive potential source 106, it is held out of conduction since the potential drop between potential source 106 and the collector electrode of transistor 127 is insufficient to forward-bias the base-emitter junction of transistor 126. Hence, transistor 126, during the interval when no pulse is present on line 110, is not in conduction. Accordingly, the collector electrode of transistor 126 which is connected through a resistor 131 to ground is normally at ground potential.

When the negative-going voltage step in the pulse of waveform C on line 110 is coupled through capacitor 125 to the base of transistor 126, transistor 126 is driven into conduction, thereby causing its collector electrode to rise rapidly toward the potential of potential source 106. This voltage rise is coupled through a capacitor 132 to the base electrode of transistor 127, thereby causing the base-emitter junction of transistor 127 to be back biased, taking transistor 127 out of conduction. The voltage rise present as a result of this pulse at the base electrode of transistor 127 immediately begins to discharge through resistors 128 and 129 toward ground potential.

The collector electrode of transistor 127 is connected through a resistor 133 and a resistor 134 to a negative potential source 114. When transistor 127 is taken out of conduction by the voltage rise on its base electrode, the collector electrode of transistor 127 is free to drop in potential toward potential source 114. The resulting current from positive potential source 106 through the base-emitter junction of transistor 126 through resistors 130, 133 and 134 toward negative potential source 114 is sufficieny large in magnitude such that transistor 126 remains in conduction even after the positive voltage rise produced on line 110 at the trailing edge of the pulse in waveform C. Only after the potential at the base electrode of transistor 127 discharges to a potential which is slightly lower in magnitude than positive potential source 106 will the transistor 127 return to conduction, thereby taking transistor 126 back out of conduction. Accordingly, as will be readily appreciated by those skilled in the art, window generator 70 is simply a form of monostable multivibrator which develops a voltage pulse at its output on line 135 in response to a negative-going voltage step at its input on line 110. The duration of this window pulse on line 135 is, of course, determined by the time constant of the circuit including capacitor 132 and resistors 128 and 129. As shown in FIG. 1, resistor 129 is a variable resistor, thereby permitting the width of the window pulse on line 135 to be adjustable.

The pulse produced on line 135 is shown as waveform E in FIG. 2. As indicated in FIG. 2, the values of resistors 133 and 134 are chosen such that waveform E will normally have a positive potential during the active region of the video line. During the interval when the window pulse is produced, the potential on line 135 drops to a negative potential, as indicated in waveform E of FIG. 2.

The signal illustrated as waveform E in FIG. 2 is coupled by way of line 135 to one input of a gating circuit 80, a second input of which is connected to receive the composite video signal provided on line 124. As indicated hereinabove, this composite video signal on line 124 is normally at a positive potential except during the flat-topped portion of the horizontal sync pulse when the signal is at zero volts and during the instants when voltage spikes (such as 203 and 204 in waveform A), due to the pre-emphasis, may cause potentials of zero volts or less on line 124. In gating circuit 80, line 124 is connected by way of a resistor 136 to the base electrode of a transistor 137. Since the emitter electrode of transistor 137 is connected to ground, transistor 137 is normally in conduction except during those intervals indicated herein-above when the signal on line 124 is at about zero volts or less, i.e., during the horizontal sync pulse and some voltage spikes. The collector electrode of transistor 137 is connected by way of a resistor 138 to positive potential source 106. With transistor 137 in conduction, its collector electrode and, therefore, line 140 are at a potential very close to ground potential.

The signal represented by waveform E of line 135 is connected to the base electrode of a transistor 139 in gating circuit 80. Transistor 139 has its emitter electrode connected to ground and its collector electrode connected to the collector electrode of transistor 137. When waveform E provides a positive potential, transistor 139 is in conduction and its collector electrode clamps line 140 to ground. When the window pulse from window generator 70 appears on line 135, transistor 139 is taken out of conduction since its base-emitter junction is back biased by the window pulse. Accordingly, transistors 139 and 137 operate in a fashion which is similar to a logic circuit AND gate in that line 140, which is common to both of their collector electrodes, is only permitted to rise toward positive potential source 106 providing both transistor 139 and transistor 137 are taken out of conduction by their respective input signals provided to their base electrodes. Hence, line 140 will remain at a potential substantially equal to ground potential until the negative-going voltage step is provided at line 135 by the initial rise of the window pulse in waveform E. As indicated in FIG. 2, transistor 137 is already out of conduction at this point since the horizontal sync pulse is in its flat-topped region.

Line 140 is also connected to the base electrode of a transistor 141 whose emitter electrode is connected to ground. With both of the transistors 137 and 139 out of conduction, line 140 is permitted to rise to a potential which forward-biased the base-emitter junction of transistor 140. Hence, transistor 141 is forward-biased at the initiation of the window pulse on line 135 and it remains forward-biased until the horizontal sync pulse is terminated on line 124. The width of the window pulse is adjusted to be sufficiently long in duration such that termination of the pulse produced at the collector electrode of transistor 141 will normally be as a result of the termination of a horizontal sync pulse on line 124. The waveform produced on the collector of transistor 141 and, therefore, at output terminal 142, is shown as waveform F in FIG. 2. The trailing edge of this pulse at output terminal 142 is, of course, in exact alignment with the trailing edge of the horizontal sync pulse in the composite video signal. The voltage spikes do not couple through gating circuit 80 since transistor 139 remains in conduction during the active region of the video.

In the synchronization format presently being utilized in PICTUREPHONE service, the vertical sync pulses are distinguishable from horizontal sync pulses only in that they are longer in duration. The initial rise produced by every vertical sync pulse is caused to be at an interval equal to one video line interval from the initial rise produced by the immediately preceding horizontal sync pulse. Since the vertical sync pulses are much longer in duration than a horizontal sync pulse, the termination of the vertical sync pulse will not occur on line 124 before the termination of the window pulse on line 135. Hence, during the vertical sync pulse intervals, it is the window pulse which will determine the trailing edge of the pulse on the collector of transistor 141 at output terminal 142. Although this provides a horizontal sync pulse at output terminal 142 which has a trailing edge with a slight error in timing, this condition only occurs during the vertical sync pulse interval and it is actually found to be far superior to the prior art circuits which provide no horizontal sync pulse at all during the vertical sync pulse intervals.

What has been described hereinbefore is a specific illustrative embodiment of the present invention. Numerous modifications may be made by those skilled in the art without departing from the spirit and scope of the invention.

We claim:

1. A sync detection apparatus for use with a composite video signal having a sync pulse interval comprising a gating means having two inputs and an output, means for coupling said composite video signal to a first one of said two inputs of said gating means, a low-pass filter means responsive to said composite video signal for providing at its output a video signal with reduced high frequency energy, means responsive to the output of said low-pass filter means for producing a window pulse beginning during the sync pulse interval, and means for coupling said window pulse to a second one of said two inputs of said gating means, whereby the trailing edge of the sync pulse in said composite video signal is coupled through said gating means to its output, characterized in that said means for producing a window pulse includes an amplitude clamp detector means for producing a voltage pulse in response to voltage peaks at the output of said low-pass filter means, and a monostable multivibrator responsive to said voltage pulse for producing said window pulse at its output.

2. A sync detection apparatus as defined in claim 1 wherein said apparatus further includes means responsive to said voltage pulse for generating a strobe pulse having a width less than said sync pulse interval, and a gated clamping means responsive to said strobe pulse for connecting said composite video signal to a reference potential.

3. A video processing circuit for use with a composite video signal having a sync pulse interval comprising a gated clamping means for clamping a signal at its input to a reference potential in response to a voltage pulse at its control input, means for coupling said composite video signal to the input of said gated clamping means, a low-pass filter means having an input and an output, means for coupling said composite video signal to the input of said low-pass filter means, pulse generating means responsive to the output of said low-pass filter means for generating a voltage pulse in response to voltage peaks at the output of said low-pass filter means, and means for coupling said voltage pulse to the control input of said gated clamping means; said pulse generating means including an amplitude clamp detector means for generating a voltage transition in response to a voltage peak at the output of said low-pass filter means, and strobe generator means for developing said voltage pulse in response to the voltage transition developed by said amplitude clamp detector means.

4. A video processing circuit as defined in claim 3 wherein the circuit further includes a gating means having two inputs at least one of which is energized by a potential at its input equal to said reference potential at its input, means for coupling the clamped composite video signal from said gated clamping means to said at least one input of said gating means, and a window pulse generating means for developing an energizing pulse at the other one of said two inputs of said gating means in response to the voltage transition developed by said amplitude clamp detector means.

* * * * *